United States Patent [19]
Benedetti

[11] 3,977,048
[45] Aug. 31, 1975

[54] MOLDING CLIPS

[75] Inventor: Edward R. Benedetti, Mount Clemens, Mich.

[73] Assignee: USM Corporation, Boston, Mass.

[22] Filed: Sept. 15, 1975

[21] Appl. No.: 613,247

[52] U.S. Cl. .................................. 24/73 FT; 52/718
[51] Int. Cl.² ..................... A44B 21/00; E04F 19/02
[58] Field of Search .................. 24/73 FT, 259 PW; 52/718

[56] References Cited
UNITED STATES PATENTS

| | | | |
|---|---|---|---|
| 2,837,184 | 6/1958 | Fernberg | 52/718 |
| 2,981,387 | 4/1961 | Dutchik | 52/718 |
| 3,004,643 | 10/1961 | MacCallum | 24/73 FT X |
| 3,006,444 | 10/1961 | MacCallum | 24/73 FT X |

FOREIGN PATENTS OR APPLICATIONS

| | | | |
|---|---|---|---|
| 1,407,821 | 6/1965 | France | 24/259 PW |
| 684,098 | 12/1952 | United Kingdom | 24/73 FT |

*Primary Examiner*—Donald A. Griffin
*Attorney, Agent, or Firm*—Aubrey C. Brine; Richard B. Megley; Vincent A. White

[57] ABSTRACT

A resilient one piece sheet metal clip having a generally U-shape is provided for push-on mounting and suspension from an upstanding pinched weld joint. The clip comprises a pair of inwardly extending flanges for gripping the pinched weld joint and outwardly biased leg portions for receiving a C-shaped molding, one of said leg portions being of greater extent than the other for contacting the panel from which the pinched weld joint extends and holding the C-shaped molding in predetermined spaced relation with the panel when the molding and clip are assembled on the pinched weld.

5 Claims, 5 Drawing Figures

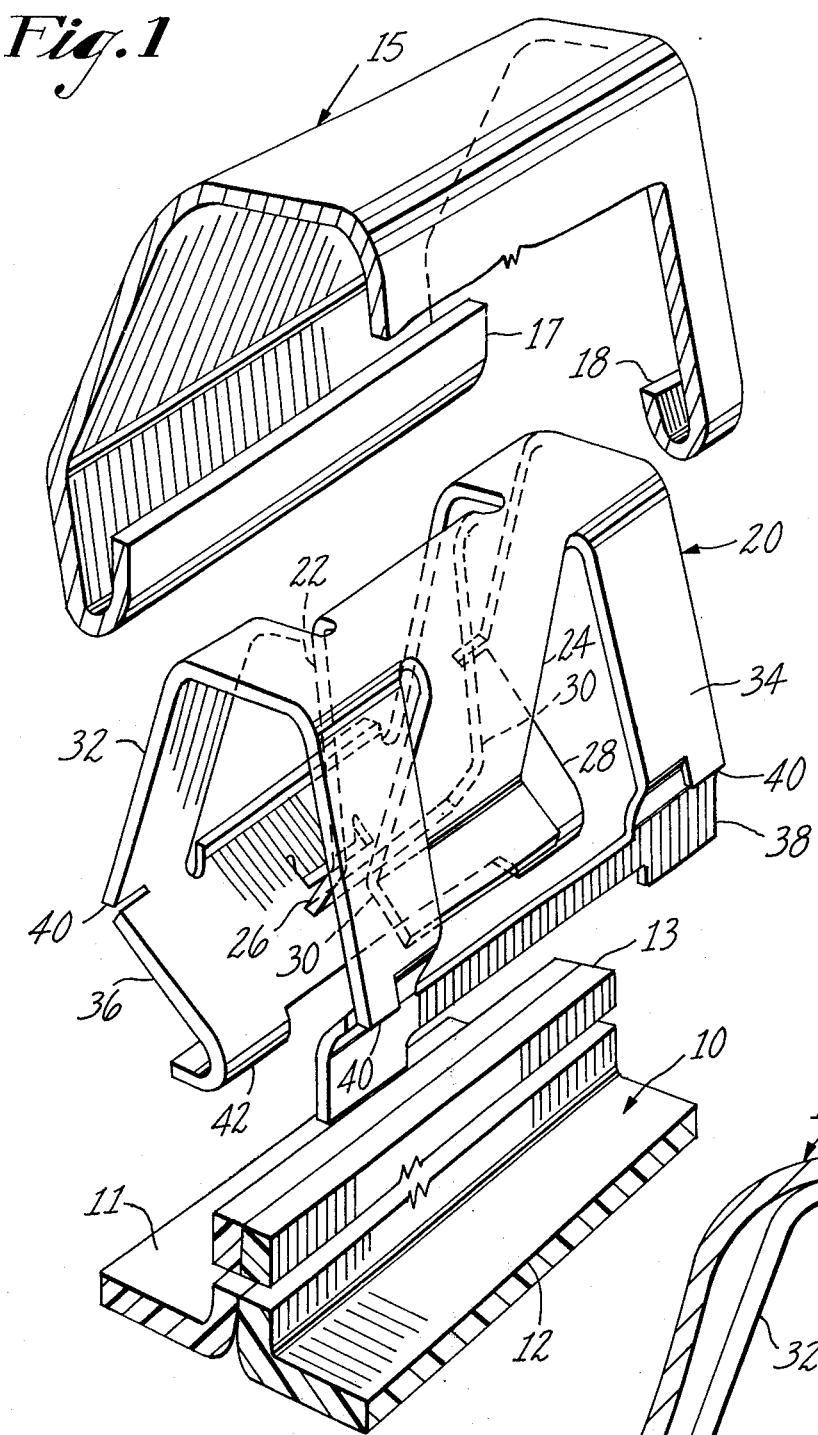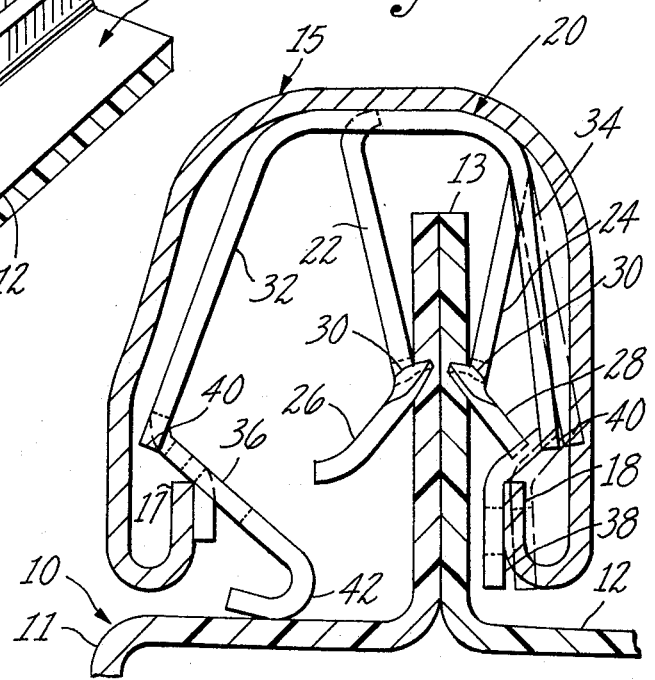

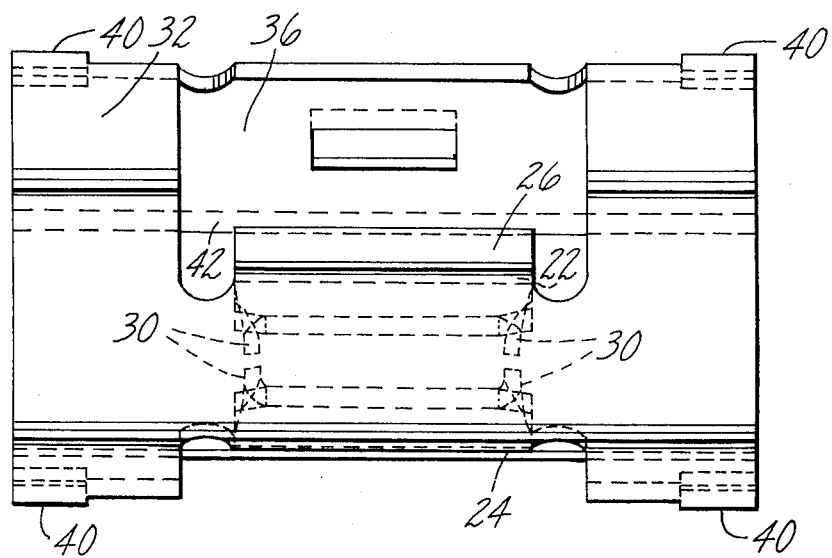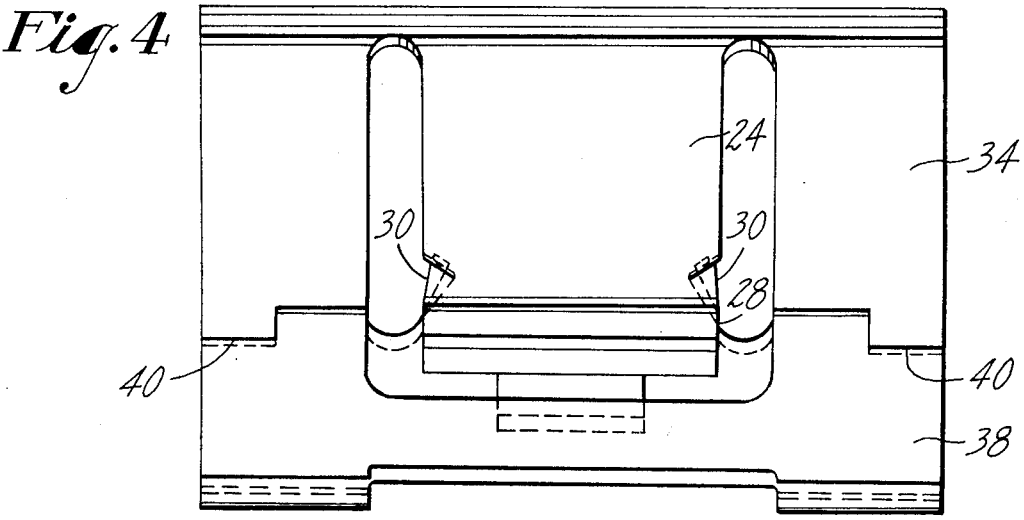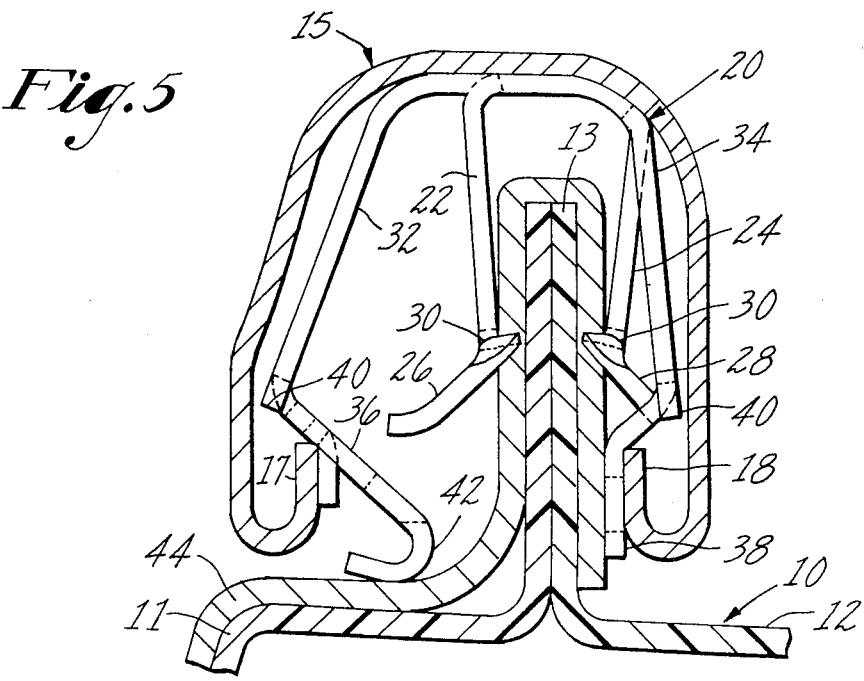

MOLDING CLIPS

BACKGROUND OF THE INVENTION

The present invention relates to fasteners and, more particularly, to a resilient clip for assembling a C-shaped molding on to a flange such as a pinched weld joint which extends from a panel. The invention is particularly useful in the automotive trim field.

In the assembly of an automobile there are areas where the body panels are fastened by bending the ends of two abutting panels away from the plane of the panels and applying what is called a pinched weld to create a substantially sealed joint between the panel members. When these joints occur on the exterior surface of the body, it is common practice to apply a C-type molding to cover the welded joint, and thus enhance the appearance of the completed structure. Generally, it is desirable that the clip or fastener which is employed to connect the C-shaped molding to the pinched weld joint be hidden from view, and in many instances it is desirable that the molding be maintained in spaced relation with the panel so that moisture and foreign matter are not trapped beneath the molding, which could consequently cause corrosion.

The present invention therefore has as an object to provide a clip which is suitable for attaching a C-shaped molding to an upstanding flange of a panel such as in automotive construction.

Another object of the invention is to provide a clip which is effective to maintain the C-shaped molding in spaced relation with the panel when assembled to an upstanding flange on the panel.

A further object of the invention is to provide a clip which is simple to manufacture from a unitary element of resilient sheet metal or other material.

SUMMARY OF THE INVENTION

The present invention provides a U-shaped clip which is advantageously employed in combination with a C-shaped molding which to be attached to a panel having an upstanding flange wherein the flange is to be covered by the C-shaped molding for ornamental purposes. The clip generally comprises a pair of inwardly projecting flanges extending from an upper portion of the clip body, and each flange has an outwardly projecting portion to facilitate receiving the upstanding panel flange when the clip is mounted on to the panel. Each of the inwardly projecting flanges comprises a pair of inwardly extending prongs at the juncture of the inwardly and outwardly projecting portions for biting into the panel flange received therebetween, and a pair of resilient legs extend downwardly from the upper portion of the clip body, each leg being spaced outwardly from the clip flanges and having a tab formed to extend inwardly toward the panel flange. A pair of tangs extending outwardly from the juncture of the leg and the pad is provided to contact the inner surface of the C-shaped molding.

To eliminate the probability of retaining moisture and foreign material under the C-shaped molding, the clip may be provided with one leg which extends downwardly for a greater distance than the other to contact the panel and retain the molding in predetermined spaced relation with the panel.

The clip is generally manufactured from a 0.025 spring steel sheet and is stamped from a single blank of material.

When a vinyl or other material is employed to cover the panel, as in some automotive applications, the clip is also effective to retain the edge portion of the vinyl and form a neat appearing structural assembly.

DESCRIPTION OF THE DRAWING

For a clear understanding of the invention, reference should be made to the accompanying drawing in which:

FIG. 1 is an exploded view, partially in section, showing elements of the preferred embodiment;

FIG. 2 is a sectional elevational view of the structure shown in FIG. 1 in the assembled condition;

FIG. 3 is a top plan view showing details of the clip employed in the assembly of FIGS. 1 and 2;

FIG. 4 is a side elevational view showing the clip of FIG. 3; and

FIG. 5 is a sectional elevational view similar to FIG. 2, showing an alternate assembly wherein the invention is employed.

DESCRIPTION OF THE PREFERRED EMBODIMENT

Referring now to the drawing and, in particular, to FIGS. 1 through 4, there is shown a panel 10 which is formed of two plates 11 and 12 respectively which are joined by pinch welding to form the upstanding flange 13. As referred to above, this is a typical structure which may be found in automobile bodies, where it is necessary to cover the flange 13 with ornamentation should the joint appear on the exterior surface of the automobile body.

In the present construction, a C-shaped molding 15 which may be constructed of any resilient material such as spring steel or plastic is employed to substantially cover the flange 13 and provide a pleasing appearance to the eye when assembled to complete the structure. The molding 15 is of sufficient length to cover the flange 13 and may be plated, or painted, to provide ornamentation to the structure. The C-shaped molding shown has a pair of inwardly turned portions 17 and 18 to aid in its assembly when sprung into place on adjacent structure.

The molding 15, in accordance with the present invention, is attached to the flange 13 by employing a clip 20. The clip 20 as shown is constructed of spring steel 0.025 inch in thickness and is formed from a single blank in accordance with common machine practice. The clip 20 is provided with a pair of inwardly projecting flanges 22 and 24 which are angled toward one another to prove a slight opening of predetermined width therebetween which is effective to receive the flange 13 in clamping engagement.

In order to facilitate assembling of the flanges 22 and 24 on to the flange 13, each of the flanges 22 and 24 are provided with an outwardly projecting portion 26 and 28 respectively, and a pair of prongs 30, 31 are provided at the juncture of the flanges 22, 24 with the outwardly projecting portions 26 and 28 respectively. The prongs 30, 31 are directed to inhibit removal of the clip 20 from the flange 13 subsequent to its assembly thereon.

In addition to the flanges 22 and 24 extending downwardly from the upper portion of the clip 20, there are a pair of resilient legs 32 and 34 which are spaced outwardly from the flanges and also extend in the downward direction. Each of the legs 32 and 34 terminates in a tab 36 and 38 respectively which extends inwardly, and a pair of tangs 40 are provided on each of the legs 32 and 34 at their juncture with the tabs 36 and 38 respectively. In the structure shown, the tabs 36 and 38 extend for the length of the clip and serve to stabilize the clip in the lengthwise direction.

The tab 36 is advantageously of greater length than the tab 38 and has a radius portion 42 for contacting the panel 10 when the assembly is in place.

In assembly, the molding 15, of sufficient length to cover the flange 13, is provided with a plurality of clips 20 depending upon the length of the molding. The clips 20 are inserted into the molding 15 and are retained in position by means of the tangs 40 and the spring action of the clip 20. The assembly is then forced into place over the flange 13 until the radius portion 42 contacts the panel 10, and is locked into position by virtue of the prongs 30 biting into the flange 13.

Referring to FIG. 5, should a vinyl or other covering 44 be employed to cover portions of the panel 10, the edges of the covering 44 are held in place by the similarly constructed clip 20. The flanges 22 and 24 generally have sufficient spring action to enable a range of thickness of flange 13 or flange and covering 44 to be held therebetween, and the prongs 30 in the construction shown will bite into the vinyl covering to retain the molding 15 in place. As in the structure shown in FIG. 2, the radius portion 42 contacts the covering 44 and retains the molding 15 in spaced relation with the adjacent structure, in this instance the panel 10 and covering 44. The invention therefore provides a clip 20 which is adaptable to a number of pinched weld constructions without requiring dimensional change to the clip when adapting it to various applications encountered.

I claim:

1. In combination with a C-shaped molding to be attached to a panel having an upstanding flange thereon, a U-shaped clip comprising a pair of inwardly projecting flanges extending from the upper portion of said clip, each of said flanges having an outwardly projecting portion to facilitate receiving the upstanding panel flange therebetween during assembly of the clip on to the panel, each of said inwardly projecting flanges further comprising a pair of inwardly extending prongs at the juncture of said outwardly projecting portion for biting into said panel flange received therebetween, a pair of resilient legs extending downwardly from the said clip upper portion and each respectively spaced outwardly from said clip flanges, each of said legs having a tab formed to extend inwardly toward said panel flange and a pair of tangs on each of said legs extending outwardly from the juncture of said leg and said tab to contact the inner surface of the C-shaped molding when assembled on said clip and inhibit removal of the molding from said clip.

2. The clip of claim 1 wherein one of said tabs extends downwardly toward said panel for a greater distance than the other tab to contact said panel and maintain the C-shaped molding in spaced relation with the panel.

3. The clip of claim 1 wherein said clip is formed from a unitary sheet of resilient material.

4. The clip of claim 3 wherein each of said legs comprises a pair of longitudinally spaced members and the ends of said space members are connected by said respective tab.

5. The clip of claim 4 wherein said spaced members and said prongs on each of said legs are symmetrically arranged with respect to the mid portion of said clip.

* * * * *